(12) United States Patent
Moravec et al.

(10) Patent No.: US 8,024,748 B1
(45) Date of Patent: Sep. 20, 2011

(54) METHOD AND SYSTEM FOR COUPLING A LASER WITH A SLIDER IN AN ENERGY ASSISTED MAGNETIC RECORDING DISK DRIVE

(75) Inventors: Mark D. Moravec, Gilroy, CA (US); Anucha Nontprasat, Pathum Thani (TH)

(73) Assignee: Western Digital Technologies, Inc., Irvine, CA (US)

( * ) Notice: Subject to any disclaimer, the term of this patent is extended or adjusted under 35 U.S.C. 154(b) by 218 days.

(21) Appl. No.: 12/556,464

(22) Filed: Sep. 9, 2009

(51) Int. Cl.
*G11B 7/08* (2006.01)
*G11B 11/00* (2006.01)
(52) U.S. Cl. ........................ 720/659; 369/300
(58) Field of Classification Search ............... 369/300, 369/112.23, 112, 27, 112.04, 112.24; 360/59; 720/659, 672, 681, 682
See application file for complete search history.

(56) References Cited

U.S. PATENT DOCUMENTS

| | | | |
|---|---|---|---|
| 5,218,584 A | 6/1993 | Gfeller | |
| 5,761,004 A * | 6/1998 | Peck | 360/236.2 |
| 6,075,673 A * | 6/2000 | Wilde et al. | 369/300 |
| 6,201,228 B1 | 3/2001 | Yoshida | |
| 6,795,630 B2 | 9/2004 | Challener et al. | |
| 6,980,374 B1 | 12/2005 | Schlesinger | |
| 7,027,700 B2 | 4/2006 | Challener | |
| 7,266,268 B2 | 9/2007 | Challener et al. | |
| 7,412,143 B2 | 8/2008 | Rottmayer et al. | |
| 2003/0007279 A1 * | 1/2003 | Johnson et al. | 360/75 |
| 2003/0090833 A1 * | 5/2003 | Tani et al. | 360/110 |
| 2005/0190682 A1 | 9/2005 | Gage et al. | |
| 2006/0067001 A1 | 3/2006 | Hsu et al. | |
| 2006/0233061 A1 | 10/2006 | Rausch et al. | |
| 2006/0256694 A1 | 11/2006 | Chu et al. | |
| 2007/0165495 A1 | 7/2007 | Lee et al. | |
| 2007/0297082 A1 | 12/2007 | Peng et al. | |
| 2008/0123219 A1 | 5/2008 | Gomez et al. | |

* cited by examiner

*Primary Examiner* — Allen Cao

(57) ABSTRACT

A method and system for providing an energy assisted magnetic recording (EAMR) disk drive are described. The EAMR disk drive includes a slider, at least one EAMR transducer on the slider, and at least one laser coupled with the slider. The slider has a slider back side, a trailing face, and an intersection. The trailing face and the slider back side meet at the intersection. The trailing face makes an angle different from ninety degrees with the slider back side at the intersection. The laser(s) have an optical axis and are optically coupled with the trailing face of the slider. The optical axis is substantially perpendicular to the intersection and parallel to the slider back side.

23 Claims, 4 Drawing Sheets

METHOD AND SYSTEM FOR COUPLING A LASER WITH A SLIDER IN AN ENERGY ASSISTED MAGNETIC RECORDING DISK DRIVE

BACKGROUND

FIGS. 1-2 depict a portion of a conventional energy assisted magnetic recording (EAMR) disk drive 10. Top and side views are shown in FIGS. 1 and 2, respectively. The conventional EAMR disk drive 10 includes a recording media 12, a conventional slider 20, and a conventional laser diode 30 that are typically attached to a suspension (not shown). Other components that may be part of the conventional EAMR disk drive 10 are not shown. The conventional slider 20 includes a back side 24 and a trailing face 26. The conventional slider 20 is typically attached to the suspension at its back side 24. A conventional EAMR transducer 22 is coupled with the slider 20 on the trailing face 26 of the slider. As can be seen in FIG. 2, the trailing face 26 and back side 24 of the slider 20 are typically perpendicular.

The conventional EAMR transducer 22 includes a grating (not separately shown) on the trailing face 26. Light from the conventional laser diode 30 is provided substantially along the optic axis 32 of the conventional laser diode 30 to the grating of conventional EAMR transducer 22. In order for the light to be coupled into the grating and back reflections reduced, the light is desired to be delivered at a particular angle to the grating. Thus, the laser diode 30 is typically mounted such that the optic axis 32 makes at an angle of eight degrees with a normal to the trailing surface 26, but is parallel to the back surface 24. This angle is shown in FIG. 1. As a result, light from the laser diode 30 is coupled into the grating of the conventional transducer.

In operation, the laser diode 30 provides light substantially along the optic axis 32 to the grating of the conventional transducer 22. The light from the laser diode 30 is coupled into the grating with reduced back reflections, and then provided to a waveguide. The waveguide directs the light toward the conventional media 12, heating a small region of the conventional media 12. The conventional EAMR transducer 22 magnetically writes to the conventional media 12 in the region the conventional media 12 is heated.

Although the conventional EAMR transducer 10 may function, manufacturing the conventional EAMR transducer 10 may be challenging. The conventional laser diode 30 and conventional slider 20 are placed and mounted to the suspension using a conventional pick and place system. As discussed above, the conventional laser diode 30 and conventional slider 20 are to be placed such that the optic axis 32 makes a specific angle, eight degrees, with normal to the trailing face 26. Accurately placing the conventional slider 20 and conventional laser diode 30 using such a conventional system may be difficult. As a result, misalignments may occur. Such misalignments may increase insertion loss of the laser light due, for example to back reflections. In addition, manufacturing yield and/or manufacturing time may suffer. Alternatively, high precision equipment may be used to mount the conventional laser diode 30 with respect to the conventional slider 20. However, such equipment is typically very high in cost.

Accordingly, what is needed is a system and method for improving manufacturability of an EAMR transducer.

BRIEF SUMMARY OF THE INVENTION

A method and system for providing an energy assisted magnetic recording (EAMR) disk drive are described. The EAMR disk drive includes a slider, at least one EAMR transducer on the slider, and at least one laser coupled with the slider. The slider has a slider back side, a trailing face, and an intersection. The trailing face and the slider back side meet at the intersection. The trailing face makes an angle different from ninety degrees with the slider back side at the intersection. The laser(s) have an optical axis and are optically coupled with the trailing face of the slider. The optical axis is substantially perpendicular to the intersection and parallel to the slider back side.

BRIEF DESCRIPTION OF SEVERAL VIEWS THE DRAWINGS

DETAILED DESCRIPTION OF THE PREFERRED EMBODIMENTS

Figure 1:
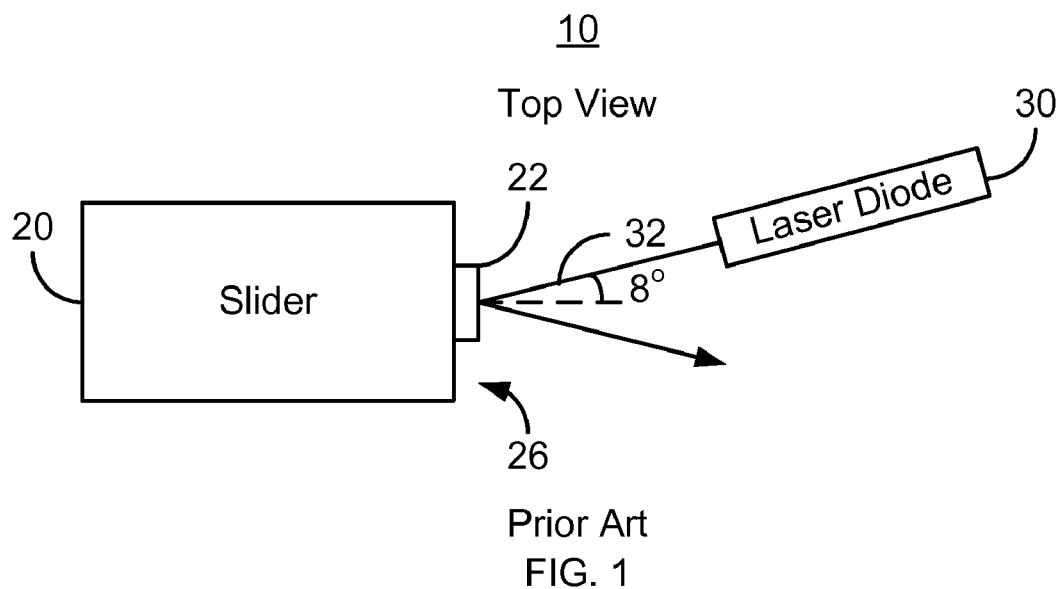
FIGS. 1-2 depict top and side views of a conventional EAMR disk drive.
Figure 2:
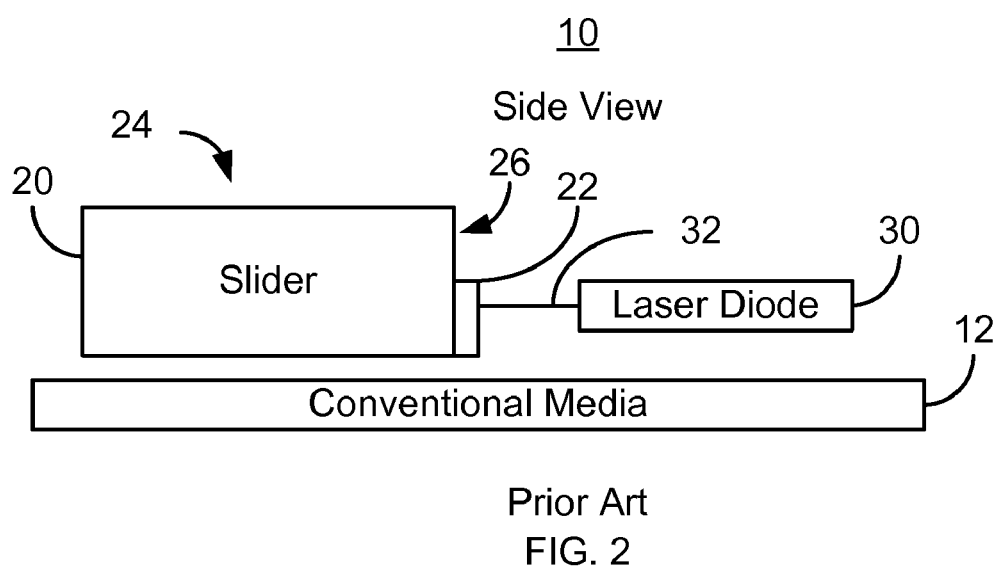
Figure 3:
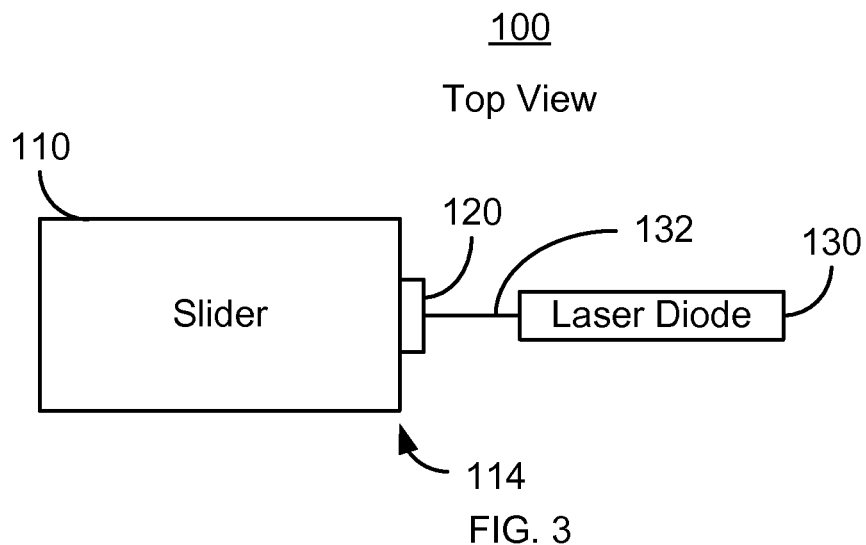
FIGS. 3-4 depict top and side views of an exemplary embodiment of a portion of an EAMR disk drive.
Figure 4:
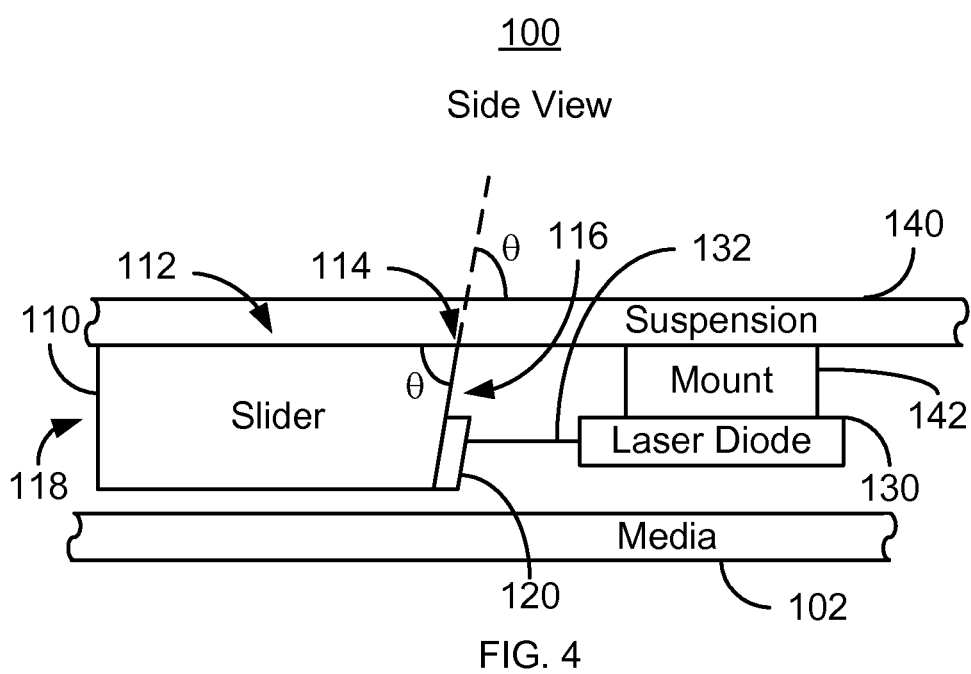

FIGS. 3 and 4 depict top and side views, respectively, of an exemplary embodiment of a portion of an EAMR disk drive 100. For clarity, FIGS. 3 and 4 are not drawn to scale. In addition, for simplicity not all portions of the EAMR disk drive 100 are shown. In addition, although the head 100 is depicted in the context of particular components other and/or different components may be used. The EAMR disk drive 100 includes media 102, a slider 110, an EAMR transducer 120, a laser 130 and a suspension 140. The slider 110 includes a back side 112, a trailing face 116, an intersection 114, and a leading face 118. The intersection 114 is an edge at which the trailing face 116 and slider back side 112 meet. The slider back side 112 and trailing face 116 meet at an angle θ at the intersection 114. As can be seen in FIG. 4, θ is different from 90°. In some embodiments, θ is not more than at least 75° and less than 90°. In some such embodiments, θ is greater than or equal to at least 81.3° and not more than 82.7°. Further, in some embodiments, θ is greater than or equal to 81.9° and not more than 82.1°. In other embodiments, θ is greater than 90° and less than or equal to 105°. In some such embodiments, θ is greater than or equal to at least 97.3° and not more than 98.7°. Further, in some embodiments, θ is greater than or equal to 97.9° and not more than 98.1°. However, the specific angle θ may depend upon the design specifications of the EAMR disk drive 100. For example, the angle θ may be within an offset of a predetermined angle. For example, θ may be within 0.7° of the predetermined angle. In other embodiments, θ may be within 0.1° of the predetermined angle. In the embodiment shown, the leading face 118 is substantially perpendicular to the back side 112. However, in another embodiment, the leading face 118 may make a different angle with the back side 112.

The laser 130 may be a laser diode 130. The laser 130 has an optic axis 132. Electromagnetic radiation (hereinafter light) from the laser 130 is directed along the optic axis 132. In the embodiment shown, the laser diode 130 is attached to the suspension 140 via a mount 142. The laser diode 130 is attached such that the optic axis is parallel to the slider back side 112 and perpendicular to at least a portion of the intersection 114 that is aligned with the grating (not shown).

The transducer 120 includes a grating, a waveguide, write poles, coils, and other components (all not separately shown in FIGS. 3-4) and resides on the trailing face 116. Thus, the grating may be substantially parallel with the trailing face 116.

In operation, light from the laser diode 130 is provided substantially along the optic axis 132 of the laser diode 130 to the grating of EAMR transducer 120. Because the optic axis 132 is perpendicular to the intersection 114 and parallel to the slider back side 112, the optic axis 132 makes an angle of θ with the trailing face 116. As a result, the optic axis 132 also makes an angle of substantially θ with the trailing face 116. Consequently, the optic axis also makes an angle of substantially θ with the grating. The angle θ is the desired angle for coupling light from the laser 130 into the grating. Thus, light from the laser 130 may be coupled into the grating, and then directed by the waveguide toward the media 102. In some embodiments, a near field transducer (not shown in FIG. 4) may be coupled with the waveguide to focus the light on the desired region of the media 102. The light provides energy to a region of the media 102, heating a small region of the media 102. The transducer 120 then writes data to this small, heated region of the media 102.

Thus, using the EAMR disk drive 100, the light from the laser 130 may be coupled to the grating of the EAMR transducer 120. As a result, reduced insertion loss and improved coupling efficiency may be achieved. Because the laser diode 130 may be mounted with its optic axis 132 perpendicular to the intersection 114 and parallel to the back face 112, the laser diode 130 and slider 110 may be more easily placed at their desired locations and attached to the suspension 140. Thus, the improvement in efficiency may be achieved while facilitating fabrication. Further, the laser diode 130 may be located substantially along a centerline (not shown in FIGS. 3-4) of the slider 110. Thus, the mass of the portion of the EAMR disk drive 100 shown may be better balanced. The EAMR disk drive 100 may, therefore, have better fly height and shock performance. The design of electrical traces in the suspension 140 (not shown) in the suspension may be simplified as the laser diode 130 is not canted with respect to the intersection 140. Moreover, the orientation of the grating (not shown in FIGS. 3-4) may be closer to that in a spin stand test setup. Consequently, better generalizations of the behavior of the EAMR disk drive 100 may be drawn from the test stand. Thus, use of the slider 120 having an angled trailing face 116 may improve fabrication and performance of the EAMR disk drive 110.

Figure 5:
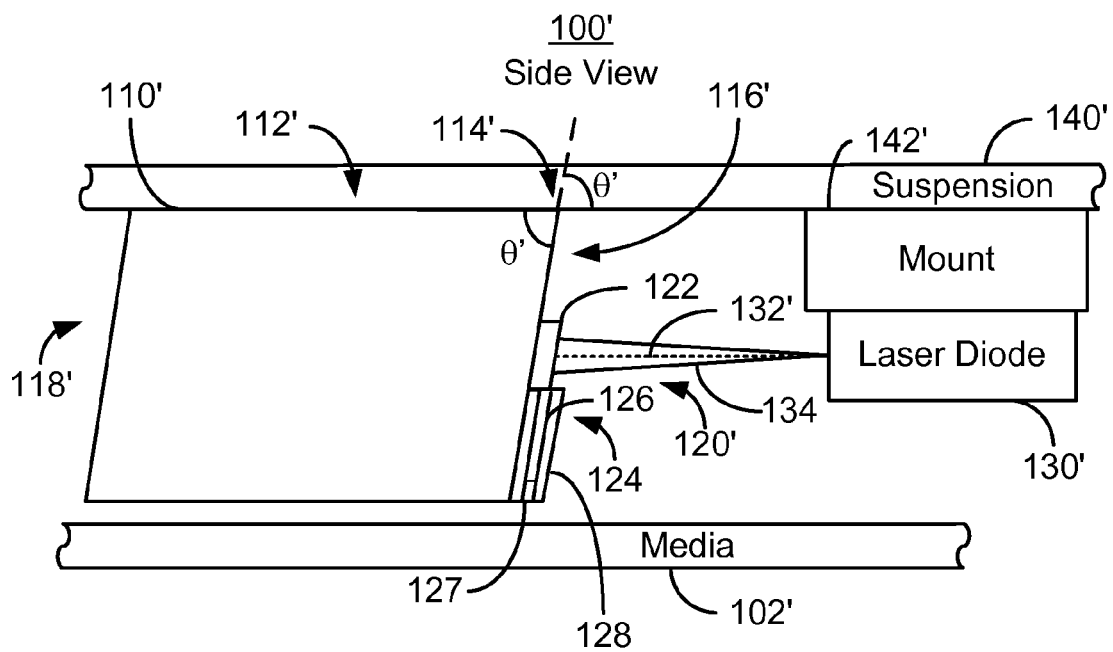
FIG. 5 depicts a side view of another exemplary embodiment of a portion of an EAMR disk drive.

FIG. 5 depicts a side view of another exemplary embodiment of a portion of an EAMR disk drive 100'. For clarity, FIG. 5 is not drawn to scale. In addition, for simplicity not all portions of the EAMR disk drive 100' are shown. In addition, although the head 100' is depicted in the context of particular components other and/or different components may be used. The EAMR disk drive 100' is analogous to the EAMR disk drive 100. Consequently, similar components have analogous labels. For example, The EAMR disk drive 100' includes media 102', a slider 110', an EAMR transducer 120', a laser 130', a suspension 140', and mount 142' corresponding to the media 102, slider 110, EAMR transducer 120, laser 130, suspension 140, and mount 142 of the disk drive 100 of FIGS. 3-4. Referring back to FIG. 5, in some embodiments, the top view of the disk drive 100' looks substantially the same as the disk drive 100 depicted in FIG. 3.

The slider 110' includes a leading face 118', a back side 112' and a trailing face 116' that meet at an intersection 114'. The slider back side 112' and trailing face 116' meet at an angle θ' at the intersection 114'. As can be seen in FIG. 5, θ' is different from 90°. In some embodiments, θ' is not more than at least 75° and less than 90°. In some such embodiments, θ' is greater than or equal to at least 81.3° and not more than 82.7°. Further, in some embodiments, θ' is greater than or equal to 81.9° and not more than 82.1°. In other embodiments, θ' is greater than 90° and less than or equal to 105°. In some such embodiments, θ' is greater than or equal to at least 97.3° and not more than 98.7°. Further, in some embodiments, θ' is greater than or equal to 97.9° and not more than 98.1°. However, the specific angle θ' may depend upon the design specifications of the EAMR disk drive 100'. For example, the angle θ' may be within an offset of a predetermined angle. For example, θ' may be less than or equal to 0.7° of the predetermined angle. In other embodiments, θ' may be not more than 0.1° from the predetermined angle. In addition, it is noted that the leading face 118' is substantially parallel to the trailing face 116'. However, in another embodiment, the leading face 118' may make a different angle with the trailing face 116' and/or back side 112'.

The laser 130' may be a laser diode 130'. The laser 130' has an optic axis 132'. The light from the laser 130' may undergo some spreading, as shown by beam 134. In the embodiment shown, the laser diode 130' is attached to the suspension 140' via a mount 142' such that the optic axis is parallel to the slider back side 112' and perpendicular to at least a portion of the intersection 114' that is aligned with the grating 122.

The transducer 120' includes a grating 122, a waveguide 126, write poles 124, a near field transducer (NFT) 127, coils (not shown), and other components (not separately shown in FIG. 5) and resides on the trailing face 116'. Thus, the grating 122 may be substantially parallel with the trailing face 116'. In addition, the transducer 120' may include other and/or different components than those depicted in FIG. 5.

In operation, light 134 beam from the laser diode 130' is provided substantially along the optic axis 132' of the laser diode 130' to the grating 122 of the EAMR transducer 120'. Because the optic axis 132' is perpendicular to the intersection 114' and parallel to the slider back side 112', the optic axis 132' makes an angle of θ' with the trailing face 116. As a result, the optic axis 132 also makes an angle of substantially θ' with the trailing face 116' and with the grating 122. The angle θ' is the desired angle for coupling light 134 from the laser 130' into the grating 122. Thus, light 134 from the laser 130' may be coupled into the grating 122, and then directed by the waveguide 126 toward the media 102'. In the embodiment shown, the NFT 127 receives light from the waveguide 126, focusing the light on the desired region of the media 102'. The light provides energy to and heats a region of the media 102'. The transducer 120' energizes the poles 128 to write data to this small, heated region of the media 102'

Thus, using the EAMR disk drive 100', the light from the laser 130' may be coupled to the grating of the EAMR transducer 120'. As a result, substantially the same benefits may be achieved using the EAMR disk drive 100' as with the EAMR disk drive 100.

Figure 6:
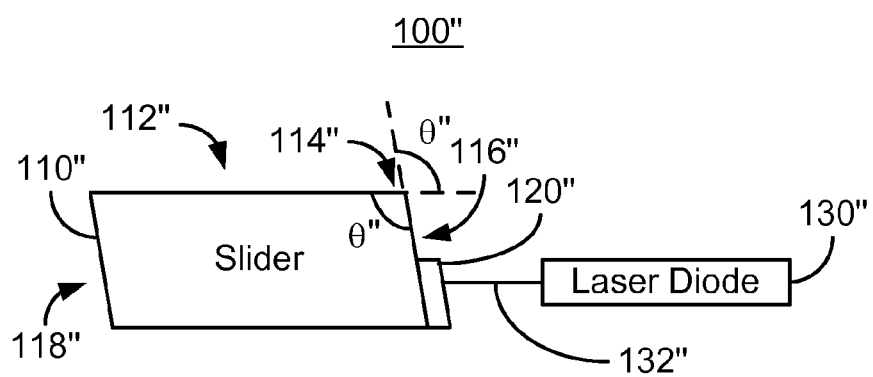
FIG. 6 depicts a side view of another exemplary embodiment of a portion of an EAMR disk drive

FIG. 6 depicts a side view of another exemplary embodiment of a portion of an EAMR disk drive 100". For clarity, FIG. 6 is not drawn to scale. In addition, for simplicity not all portions of the EAMR disk drive 100" are shown. In addition, although the head 100" is depicted in the context of particular components other and/or different components may be used. The EAMR disk drive 100" is analogous to the EAMR disk drives 100 and 100'. Consequently, similar components have analogous labels. For example, The EAMR disk drive 100" includes media (not shown), a slider 110", an EAMR transducer 120", a laser 130", a suspension (not shown), and mount (not shown) corresponding to the media 102/102', slider 110/110', EAMR transducer 120/120', laser 130/130', suspension 140/140', and mount 142/142' of the disk drive 100/100' of FIGS. 3-5. However, for added clarity, fewer components are shown in FIG. 6 than in FIGS. 3-5. Referring back to FIG. 6, in some embodiments, the top view of the disk drive 100" looks substantially the same as the disk drive 100 depicted in FIG. 3.

The slider 110" includes a leading face 118", a back side 112" and a trailing face 116" that meet at an intersection 114". The slider back side 112" and trailing face 116" meet at an angle θ' at the intersection 114". As can be seen in FIG. 6, θ" is different from 90° and larger than 90°. In some embodiments, θ" is not more than at least 75° and less than 90°. In some such embodiments, θ" is greater than or equal to at least 81.3° and not more than 82.7°. Further, in some embodiments, θ" is greater than or equal to 81.9° and not more than 82.1°. In other embodiments, θ" is greater than 90° and less than or equal to 105°. In some such embodiments, θ" is greater than or equal to at least 97.3° and not more than 98.7°. Further, in some embodiments, θ" is greater than or equal to 97.9° and not more than 98.1°. However, the specific angle θ" may depend upon the design specifications of the EAMR disk drive 100". For example, the angle θ" may be within an offset of a predetermined angle. For example, θ" may be less than or equal to 0.7° of the predetermined angle. In other embodiments, θ" may be not more than 0.1° from the predetermined angle. In addition, it is noted that the leading face 118" is substantially parallel to the trailing face 116". However, in another embodiment, the leading face 118" may make a different angle with the trailing face 116' and/or back side 112".

The laser 130" may be a laser diode 130' and has an optic axis 132". In the embodiment shown, the laser diode 130" may be is attached to the suspension (not shown) via a mount (not shown) such that the optic axis is parallel to the slider back side 112" and perpendicular to at least a portion of the intersection 114" that is aligned with the grating (not shown). The transducer 120" is analogous to the transducers 120/120' and thus includes similar components. For example, the transducer 120" may include a grating, a waveguide, write pole(s), an NFT, coils, and other components (all not shown in FIG. 6) and resides on the trailing face 116". Thus, the grating may be substantially parallel with the trailing face 116". In addition, the transducer 120" may include other and/or different components than those depicted in FIG. 6.

The EAMR disk drive 100" operates in substantially the same manner as the transducers 100 and 100'. Consequently, the light from the laser 130" may be coupled to the grating of the EAMR transducer 120". As a result, substantially the same benefits may be achieved using the EAMR disk drive 100" as with the EAMR disk drives 100/100'.

Figure 7:
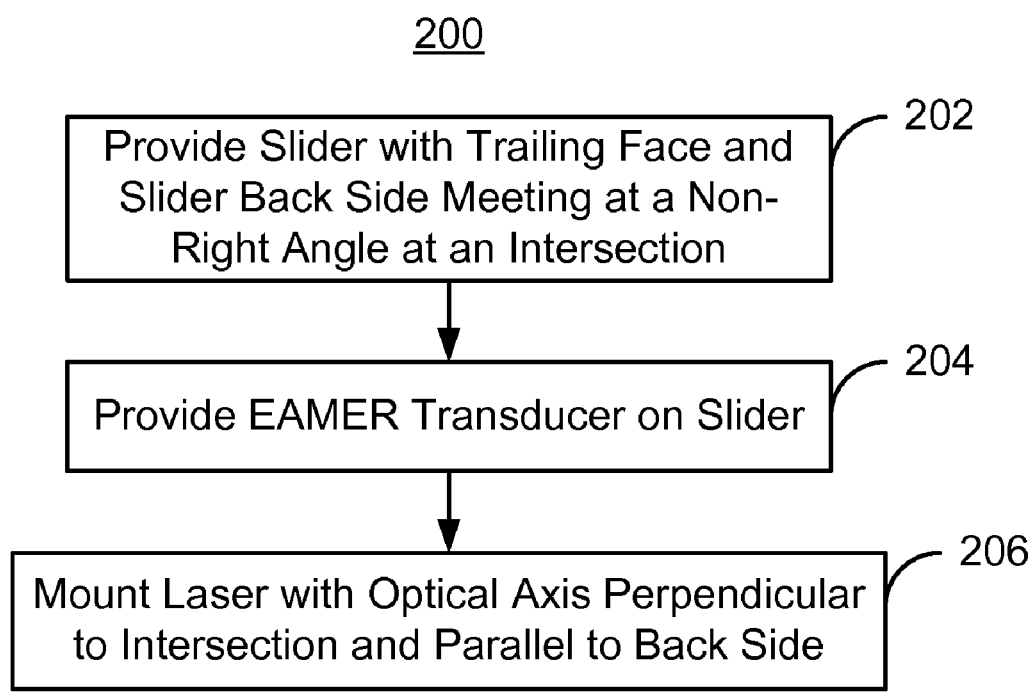
FIG. 7 depicts an exemplary embodiment of a method of forming a portion of an EAMR disk drive.

FIG. 7 depicts an exemplary embodiment of a method 200 of forming a portion of an EAMR disk drive. For simplicity, some steps may be omitted. The method 200 is described in the context of the EAMR disk drive 100. However, the method 200 may be used for other EAMR disk drives (not shown). The method 200 also may commence after formation of some portions of the EAMR disk drive 100. The method 200 is also described in the context of providing a single disk drive 100. However, the method 200 may be used to fabricate multiple disk drives at substantially the same time.

The slider 110 is provided, via step 202. Thus, the slider 110 having a back side 112, a trailing face 116, and an intersection 114 at which the trailing face 116 and the back side 112. The slider 110 is provided in step 202 such that the trailing face 116 and back side 112 meet at an angle θ at the intersection. The angle θ is different from ninety degrees. In some embodiments, the angle θ takes on one or more of the values described above. The leading face 118 and back side 112 may make another angle where they intersect. In one embodiment, step 202 includes cleaving the slider 110 at a desired angle. Step 202 may also include grinding, lapping, or otherwise machining the slider 110 to provide the angle θ. Thus, step 202 provides the slider having an angle that is within an error of a desired angle. In one embodiment, the error is not more than 0.7°. In some such embodiments, the error is not more than 0.1°.

At least one EAMR transducer 120 is provided on the slider 110, via step 204. Thus, step 204 includes providing the grating, waveguide, pole(s), coil(s), and/or other components of the EAMR transducer 120.

At least one laser 130 is mounted with the slider, via step 206. In one embodiment, step 206 includes providing a laser diode for the laser 130. In step 206, the laser 130 is mounted such that the laser 130 is optically coupled with the trailing face 116 of the slider 110 and such that the optic axis 132 is substantially perpendicular to the intersection 114 and parallel to the slider back side 112. The laser 130 is thus affixed for example to the mount 142 that is coupled to the slider 130.

Thus, using the method 200, the disk drives 100/100'/100" may be provided. As a result, the benefits of the disk drives 100/100'/100" may be achieved.

We claim:

1. An energy assisted magnetic recording (EAMR) disk drive comprising:
   a slider having a slider back side, a trailing face, and an intersection, the trailing face and the slider back side meeting at the intersection, the trailing face making an angle different from ninety degrees with the slider back side at the intersection;
   at least one EAMR transducer on the slider; and
   at least one laser coupled with the slider, the at least one laser having an optical axis and being optically coupled with the trailing face of the slider, the optical axis being substantially perpendicular to the intersection and parallel to the slider back side.

2. The EAMR disk drive of claim 1 wherein the at least one laser includes at least one laser diode.

3. The EAMR disk drive of claim 1 wherein the at least one EAMR transducer further includes:
   at least one grating on the trailing face of the slider.

4. The EAMR disk drive of claim 3 wherein the at least one transducer further includes:
   at least one wave guide optically coupled with the at least one grating;
   at least one near-field transducer optically coupled with the at least one wave guide, the at least one near-field transducer for heating a region of a recording media; and
   at least one magnetic recording pole configured to provide a write field in the region of the magnetic recording media during heating.

5. The EAMR disk drive of claim 3 wherein the at least one laser is optically coupled to the grating.

6. The EAMR disk drive of claim 1 wherein the angle is not more than at least 75 degrees and less than 90 degrees.

7. The EAMR disk drive of claim 6 wherein the angle is greater than or equal to at least 81.3 degrees and not more than 82.7 degrees.

8. The EAMR disk drive of claim 6 wherein the angle is greater than or equal to 81.9 and not more than 82.1.

9. The EAMR disk drive of claim 1 wherein the angle is greater than 90 degrees and not more than 105 degrees.

10. The EAMR disk drive of claim 1 wherein the angle is within 0.7 degrees of a predetermined angle.

11. The EAMR disk drive of claim 10 wherein the angle is within 0.1 degrees of the predetermined angle.

12. An energy assisted magnetic recording (EAMR) disk drive comprising:
   a slider having a slider back side, a trailing face, and an intersection, the trailing face and the slider back side meeting at the intersection, the trailing face making an angle different from ninety degrees with the slider back side at the intersection, the angle being within 0.1 degrees of a predetermined desired angle;
   at least one write transducer residing on the trailing face of the slider and including at least one grating; and
   at least one laser diode coupled with the slider, each of the at least one laser diode having an optical axis and being optically coupled with the at least one grating, the optical axis being substantially perpendicular to the intersection and parallel to the slider back side.

13. A method for providing an energy assisted magnetic recording (EAMR) disk drive comprising:
   providing a slider having a slider back side, a trailing face, and an intersection, the trailing face and the slider back side meeting at the intersection, the trailing face making an angle different from ninety degrees with the slider back side at the intersection;
   providing at least one EAMR transducer on the slider; and
   mounting at least one laser with the slider, the at least one laser having an optical axis and being optically coupled with the trailing face of the slider, the laser diode being mounted such that the optical axis is substantially perpendicular to the intersection and parallel to the slider back side.

14. The method of claim 13 wherein the at least one laser includes at least one laser diode.

15. The method of claim 13 wherein the step of providing the at least one EAMR transducer further includes:
   providing at least one grating on the trailing face of the slider.

16. The method of claim 15 wherein the mounting step further includes:
   affixing the at least one laser diode such that the at least one laser diode is optically coupled to the grating.

17. The method of claim 13 wherein the step of providing the slider further includes:
   machining the trailing face of the slider to provide the angle.

18. The method of claim 17 wherein the angle is at least 75 degrees and less than 90 degrees.

19. The method of claim 18 wherein the angle is greater than or equal to 81.3 degrees and not more than 82.7 degrees.

20. The method of claim 18 wherein the angle is greater than or equal to 81.9 degrees and not more than 82.1 degrees.

21. The method of claim 13 wherein the angle is greater than 90 degrees and not more than 105 degrees.

22. The method of claim 18 wherein the angle is within 0.7 degrees of a predetermined angle.

23. The method of claim 22 wherein the angle is within 0.1 degrees of the predetermined angle.

* * * * *